(12) United States Patent
Cregg et al.

(10) Patent No.: US 9,300,484 B1
(45) Date of Patent: Mar. 29, 2016

(54) ACKNOWLEDGEMENT AS A PROPAGATION OF MESSAGES IN A SIMULCAST MESH NETWORK

(71) Applicant: SmartLabs, Inc., Irvine, CA (US)

(72) Inventors: Daniel Brian Cregg, Orange, CA (US); Joseph J. Dada, III, Newport Beach, CA (US)

(73) Assignee: SMARTLABS, INC., Irvine, AZ (US)

( * ) Notice: Subject to any disclaimer, the term of this patent is extended or adjusted under 35 U.S.C. 154(b) by 360 days.

(21) Appl. No.: 13/941,392

(22) Filed: Jul. 12, 2013

(51) Int. Cl.
G06F 15/16 (2006.01)
G06F 15/177 (2006.01)
H04L 12/18 (2006.01)
G06F 15/173 (2006.01)

(52) U.S. Cl.
CPC .................................. H04L 12/1868 (2013.01)

(58) Field of Classification Search
CPC .................................................. H04L 12/1868
USPC .......................................................... 709/204
See application file for complete search history.

(56) References Cited

U.S. PATENT DOCUMENTS

| | | | | |
|---|---|---|---|---|
| 7,345,998 B2 * | 3/2008 | Cregg | ..................... | H04B 3/542 370/230 |
| 7,663,502 B2 * | 2/2010 | Breed | ..................... | B60C 11/24 340/12.25 |
| 7,904,187 B2 * | 3/2011 | Hoffberg | ............... | G05B 15/02 370/200 |
| 8,081,649 B2 * | 12/2011 | Cregg | ..................... | H04B 3/542 370/432 |
| 8,190,275 B2 * | 5/2012 | Chang | ........................ | H02J 3/14 700/19 |
| 8,301,180 B1 * | 10/2012 | Gailloux | ............. | H04L 12/5875 455/412.1 |
| 8,495,244 B2 * | 7/2013 | Bonar | .................. | H04B 7/0689 709/239 |
| 8,516,087 B2 * | 8/2013 | Wilson | .................. | H04L 12/282 709/217 |
| 8,610,305 B2 * | 12/2013 | Sarid | ........................ | H02G 3/00 307/116 |
| 8,619,819 B2 * | 12/2013 | Seelman | ............. | H04L 12/2807 370/352 |
| 8,653,935 B2 * | 2/2014 | Baker | ............... | H04W 52/0229 340/3.2 |
| 9,014,067 B2 * | 4/2015 | Chun | .................... | H04B 7/0689 370/281 |
| 9,054,892 B2 * | 6/2015 | Lamb | ..................... | H04L 12/462 |
| 9,071,453 B2 * | 6/2015 | Shoemaker | ........... | H04L 67/125 |
| 9,078,087 B2 * | 7/2015 | Yoon | ..................... | H04W 8/005 |
| 9,081,501 B2 * | 7/2015 | Asaad | ...................... | G06F 15/76 |
| 9,143,962 B2 * | 9/2015 | Brady | ..................... | H04L 43/10 |
| 9,148,443 B2 * | 9/2015 | Chizeck | ................ | G06F 21/316 |
| 2014/0009063 A1 * | 1/2014 | Cregg | ................. | H05B 37/0272 315/34 |

(Continued)

OTHER PUBLICATIONS

Insteon. Whitepaper: The Details. Version 2.0, 2013.*

(Continued)

*Primary Examiner* — Melvin H Pollack
(74) *Attorney, Agent, or Firm* — Knobbe, Martens, Olson & Bear, LLP

(57) ABSTRACT

The presently described apparatus and method extends the capabilities of an Insteon network of devices. The method includes transmitting a group command message from a first device to a selected group of devices having a common group number, and receiving the group command message by a second device of the group or receiving a clean-up message transmitted by the first device, and resetting the state of the second one of the devices, and transmitting an acknowledgement message to the first devices from the second device, and receiving the first acknowledgement message by a third one of the devices that had not received the group command message or a clean-up message previously, and restoring the state of the third one of the devices.

5 Claims, 8 Drawing Sheets

(56) References Cited

U.S. PATENT DOCUMENTS

| | | | | |
|---|---|---|---|---|
| 2014/0022061 A1* | 1/2014 | Apte | ............... | H04L 12/2803 340/12.5 |
| 2014/0219193 A1* | 8/2014 | Linde | ............ | H04W 72/1215 370/329 |
| 2014/0269425 A1* | 9/2014 | Fisher | ............ | H04L 41/0668 370/254 |
| 2014/0280398 A1* | 9/2014 | Smith | ................. | G06F 9/544 707/825 |
| 2014/0321268 A1* | 10/2014 | Saltsidis | ............ | H04L 41/0668 370/226 |
| 2015/0120000 A1* | 4/2015 | Coffey | ............ | H04L 12/2803 700/13 |
| 2015/0295949 A1* | 10/2015 | Chizeck | ............ | H04L 12/12 726/23 |

OTHER PUBLICATIONS

"Refresh! INSTEON Technology," Electronic Design (EE) Product News, Staff Article, Apr. 5, 2006.*

\* cited by examiner

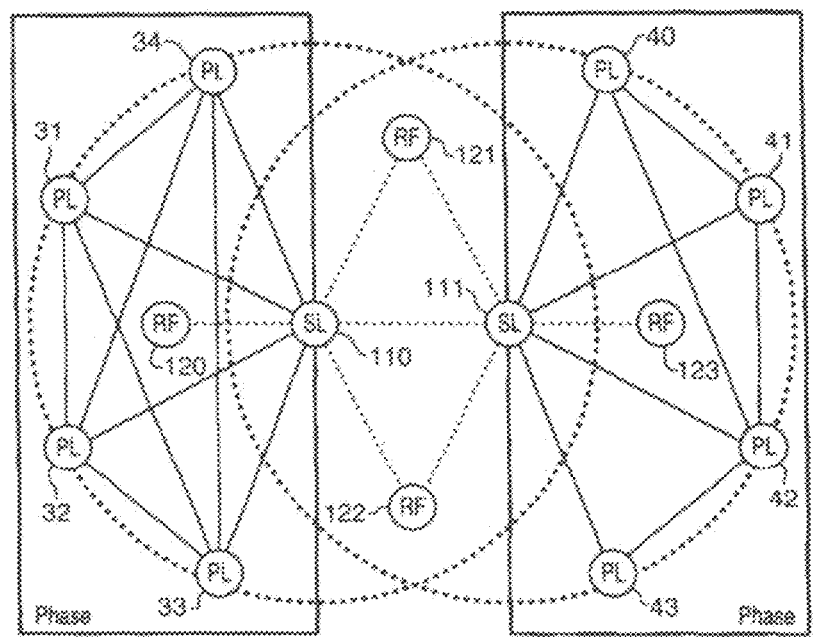
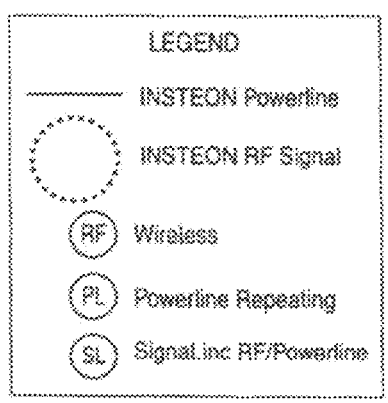
FIG. 1

| | | | | |
|---|---|---|---|---|
| Group Clean-up Direct Message (10 Bytes) | | | | |
| 3 Bytes | 3 Bytes | 1 Byte | 2 Bytes | 1 Byte |
| Originator Address | Device Address from Originators database | Direct message with optimal hops | Same Command as initial Group Broadcast and Group number | CRC |

| Field | | Bits | Contents |
|---|---|---|---|
| Originator Address | | 24 | Message Originator's address |
| Recipient Address | | 24 | Intended recipient based on Originator's local database group list |
| Message Flags | Message Type | 3 | Set to 010b for indication of Group Clean-up message type |
| | Size Flag | 1 | 0 (Zero) for Standard messages |
| | ps Left | 2 | Initially set to 3 (11b), then to 3 – value of last message received from intended recipient. Decremented as message is repeated. |
| | Max Hops | 2 | Initially set to 3 (11b), then to 3 – value of last message received from intended recipient. |
| Command 1 | | 8 | Typically 0x11 |
| Command 2 | | 8 | Group number |
| CRC | | 8 | Cyclic Redundancy Check |

FIG. 2

| | | | | | |
|---|---|---|---|---|---|
| \*Group Clean-up Acknowledgement Message | | | | | |
| 3 Bytes | 3 Bytes | 1 Byte | | 2 Bytes | 1 Byte |
| From recipient | To Originator | Group Direct acknowledgement with optimal hops | Group Clean-up message | Same Command and Group number as initial Group Broadcast | CRC |

*The number of hops used for this message will correspond to either a maximum of 3, or to the hops used for the last message received from the intended recipient. (3 minus remaining hop count when received)

| Field | | Bits | Contents |
|---|---|---|---|
| Recipient Address (now acting as the originating transmitter) | | 24 | Message Originator's address |
| Originator Address (now the intended target of the message) | | 24 | Intended recipient based on Originator's local database group list |
| Message Flags | Message Type | 3 | Set to 011b for indication of Group Clean-up Acknowledgement message type |
| | Size Flag | 1 | 0 (Zero) for Standard messages |
| | Hops Left | 2 | Initially set to 3 (11b), then to 3 - value of last message received from intended recipient. Decremented as message is repeated. |
| | Max Hops | 2 | Initially set to 3 (11b), then to 3 - value of last message received from intended recipient. |
| Command 1 | | 8 | Typically 0x11 |
| Command 2 | | 8 | Group number |
| CRC | | 8 | Cyclic Redundancy Check |

FIG. 3

| MESSAGE FLAG BITS | | |
|---|---|---|
| Bit Setting | Flag | Meaning |
| Bit 7 (Broadcast /NAK) (MSB) | | 100 = Broadcast Message |
| Bit 6 (Group) | Message Type | 000 = Direct Message<br>001 = ACK of Direct Message<br>101 = NAK of Direct Message |
| Bit 5 (Acknowledge) | | 110 = Group Broadcast Message<br>010 = Group Cleanup Direct Message<br>011 = ACK of Group Cleanup Direct Message<br>111 = NAK of Group Cleanup Direct Message |
| Bit 4 | Extended | 1 = Extended Message<br>0 = Standard Message |
| Bit 3<br>Bit 2 | Hops Left | 00 = 0 message retransmissions remaining<br>01 = 1 message retransmission remaining<br>10 = 2 message retransmissions remaining<br>11 = 3 message retransmissions remaining |
| Bit 1<br>Bit 0 | Max Hops | 00 = Do not retransmit this message<br>01 = Retransmit this message 1 times maximum<br>10 = Retransmit this message 2 times maximum<br>11 = Retransmit this message 3 times maximum |

FIG. 4

ND SIMULCAST MESH
ACKNOWLEDGEMENT AS A PROPAGATION OF MESSAGES IN A SIMULCAST MESH NETWORK

BACKGROUND

The industrial field of this disclosure relates to wired and wireless communications and in particular to the Insteon® network. The Insteon network and protocol are disclosed in U.S. Pat. No. 8,081,649. In general, an Insteon system is able to propagate radio frequency (RF) and power line transmissions over extended distances at relatively low power. Such a network consists of a number of spatially separated transceiver devices and processor based software protocols requiring each device to retransmit a received transmission, usually more than once. The retransmissions are simultaneously sent out by all devices that have received the original transmission. In this manner, an original transmission is able to propagate by hops from one device to the next so that a distant device, although not able to receive the original transmission may be able to receive a retransmission. When the number of retransmissions is more than one, the probability of the most distant device receiving a message is increased so that with a large network operating with multiple retransmissions, even the most distant device may be able to receive the originally transmitted message. However, because of RF transmission interference, low transmission power, power line noise, power line phase incompatibilities and other problems there is a need for improved methods to assure full transmission reception over the entire network.

The complexity of a mesh network of devices is significantly reduced based on distributed intelligence allowing all devices to simultaneously respond to a generic input with each executing a unique or specific local response. Other networks use a series of specific commands each directed to a particular device from a central controller. This limits scalability of the network due to eventual delays as the network increases in size.

BRIEF SUMMARY AND OBJECTIVES

The presently described extension of the Insteon network technology and its operating protocol provides for improved operations in meeting the primary objective of the network, which is to assure that all designated devices (devices) receive an intended transmission, or at least a notice that such transmission has occurred. As defined in U.S. Pat. No. 8,081,649 an original transmission is received by Insteon devices in the network that are within range and is retransmitted so that when multiple retransmissions occur the probability of remote devices receiving a message incorporated in an original transmission is high. However, experience has shown that for the reasons described above, some intended recipients of the original transmission may not receive it. The presently described improvement on the Insteon protocol provides a further assurance of fully completing a transmission-reception cycle to all designated or targeted devices within the network.

The present Insteon protocol includes acquiring acknowledgements from each member of a targeted group to which an original transmission is sent. Presently, when one member of the group does not acknowledge, expensive remedial steps must be taken such as a physical inspection of the errant device. However, when a group comprises a plurality of members, if the errant member receives an acknowledgement transmission sent by another member of the same group, the errant member is able to recognize that an original transmission was sent and then is able to transmit its own acknowledgement as well as take a required action. This improved protocol has significant advantages and may provide cost and time savings in the management of the network. Therefore, each acknowledgement transmission from a group member serves two purposes; first to inform the original transmitter device that the group member did receive the original transmission and took a designated action, and second, to further inform other members of the same group that the original transmission did in fact occur so that they may take action as well. Other benefits of this extension to the Insteon protocol will be identified in the following detailed description.

BRIEF DESCRIPTION OF THE DRAWINGS

FIG. 1 is an example block diagram of a network of Insteon modules in mutual communication;

FIG. 2 is an example chart showing a breakdown and byte assignment of a Group Clean-up Direct message and data stored in the message of the disclosed method;

FIG. 3 is an example chart showing a breakdown and byte assignment of an Acknowledgement Message and data stored in the message of the disclosed method;

FIG. 4 is an example chart showing a typical Insteon message structure;

DETAILED DESCRIPTION

Figure 5:
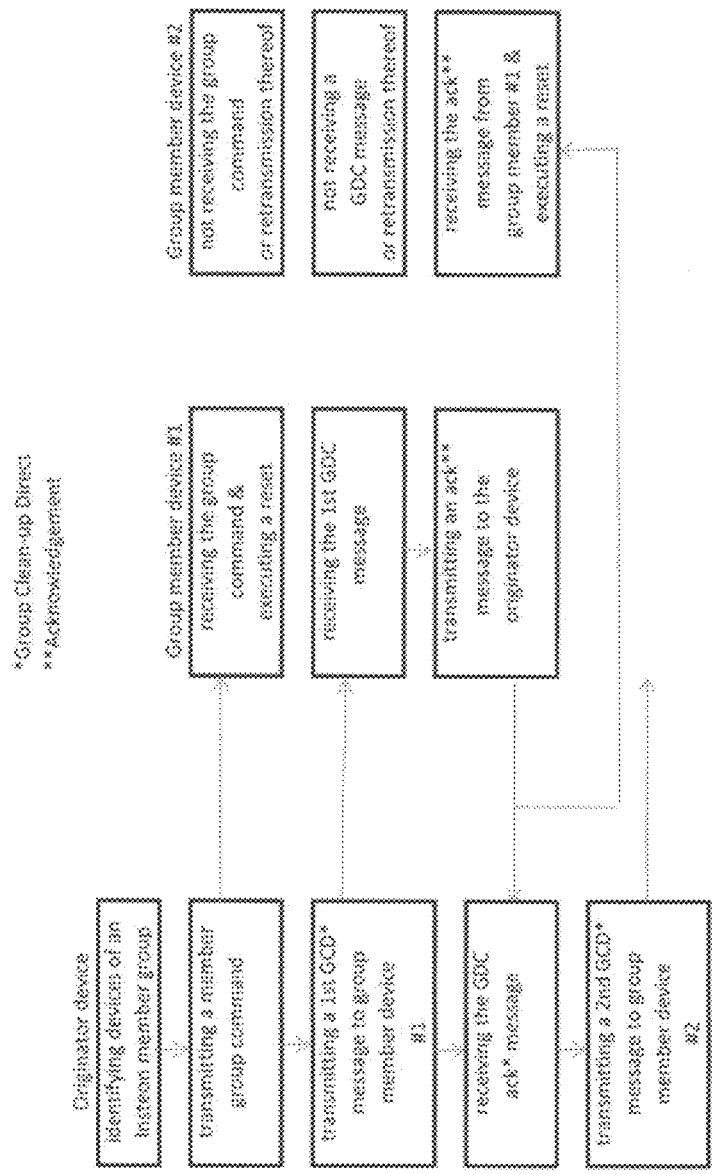
FIG. 5 is an example block diagram defining the disclosed method.

As defined in U.S. Pat. No. 8,081,649 which is incorporated herein by reference in its entirety, a network of spatially separated Insteon® modules ("devices" herein) are able to communicate by electrical or optical transmission means with each other so that they may be used to relay messages to intended recipients although such recipients are not able to directly receive a transmission from a particular device. FIG. 1 is an example of such a network as previously described in the '649 patent and shows how multiple Insteon devices, each of which is capable of repeating transmissions, form a reliable communications network. In FIG. 1 devices 110 and 111, are capable of both power line and radio frequency (RF) communications. Devices 120, 121, 122, and 123 are only capable of RF communications. The remaining devices: 31, 32, 33, 34 and 40, 41, 42, 43, are only capable of power line communications. Every device is capable of repeating received transmissions, using the Insteon protocol according to the '649 patent. Adding more devices increases the number of available pathways for messages to travel. Path diversity results in a higher probability that a particular transmission will arrive at its intended destination, so the more devices in a network the more reliable it tends to be.

This relaying process will occur when each of the devices is set to automatically retransmit a received transmission even though a given device is not the intended target. Such retransmissions can result in transmission hops over a significant distance to reach an intended remote device even using relatively low transmission power. The '649 patent details the equipment, system arrangement, message structure and software automation that is necessary to accomplish this desirable outcome. One aspect of the Insteon network and its intended objectives is to assure that transmissions are, in fact, received by all targeted devices. Therefore after a transmission is sent to all network devices or to an identified sub-group of the network, the originating device transmits an invitation to each of the targeted devices in turn to send back an acknowledgement transmission. Failing to receive an acknowledgement after one or more additional attempts may well initiate remedial action which may incur expense.

In the Insteon network the spatially separated devices are able to be in mutual communication by at least one of wired and wireless means. Each device has a data processor, a memory device, a transceiver, and a digital instruction set, which is stored within the memory device and which enables a protocol for processing messages that are received, and for compiling and transmitting messages as well.

A plurality of the devices may be present in a transmission space which may, for instance, include the interior of a building or other structure. The present method involves the transmission of information between the devices and includes a specific sequence of steps. As described, communications may be carried out via power line transmissions, radio frequency transmissions, or through other means and may include simultaneous transmissions via multiple means. The set of possible transmission means is referred to herein as "the channel."

FIGS. 2, 3, and 4 define the nature and specific details of the messages that are included in the present method. FIG. 4 is a general outline of the message structure. A primary message targeted to one or more members of a selected group of the devices is transmitted by a device referred to herein as an "originator device," see FIG. 5. Other devices in the transmission space, such as the 1st group member and the 2nd group member shown in FIG. 5 may receive the primary message and then may retransmit it. The information in the primary message causes group members to take an action such as restoring to a pre-determined or initial or previous state. Devices that are not targeted group members may ignore the information. Because of the potentially large number of simultaneous retransmissions, there is a high probability that the primary message will reach all of its targeted group members.

To assure that the primary message has reached all of its targeted group members, the originator device transmits a series of secondary messages, one at a time in sequence; each targeted to only a selected one of the group members of the target group. Each secondary message, as before, is received by the other devices and is then retransmitted. The secondary message is referred to as a Group Clean-up Direct message and is intended to both confirm and re-enforce the original intention of the primary message. FIG. 2 shows a breakdown of an example of the information in such a message.

All other devices that receive and repeat the secondary message have the additional opportunity to interrogate the secondary message for relevance to information stored in their own databases. The information carried by both the primary message and the secondary message contains the address, and the group number of the originator device as well as a command; see commend 1 in FIG. 2. Each group member may therefore execute the received command and change its state to match values that are stored in its own database. Primary, secondary, and repeated messages typically occur at different times so that transient noise in the channel does not present a problem. The repeating of messages by the other devices increases the likelihood of all group members successfully receiving the primary and the secondary messages.

Upon receipt of a Group Clean-up Direct message (FIG. 2), a targeted group member responds by transmitting an acknowledgement message (FIG. 3) in the next message time slot when the channel is clear. When the originator device receives an acknowledgement message from a targeted group member, or alternately has reached a predetermined maximum number of retransmissions without receiving a corresponding acknowledgement message, it proceeds to the next group member in its memory. Information about each group member of a targeted group is stored in memory and includes the addresses of the group members as well as other information. FIG. 3 shows a breakdown of an example of the information in an acknowledgement message as transmitted by a group member after having received a secondary message from the originator device or a retransmission of the secondary message from any one of the other devices.

A group member may receive the Group Clean-up Direct message directly from the originator device as transmitted by the originator device, or from one or more of the other devices including other members of the same group, as a retransmission of the Group Clean-up Direct message. Furthermore, the group member may receive a transmitted acknowledgement message transmitted by any member of the same group. In certain cases, the group member will act to execute the command and transmit an acknowledgement message. The acknowledgement messages may be received directly by the originator device as transmitted by the group members, or may receive the acknowledgement message as retransmitted by one or more of the other devices.

Figure 6A:
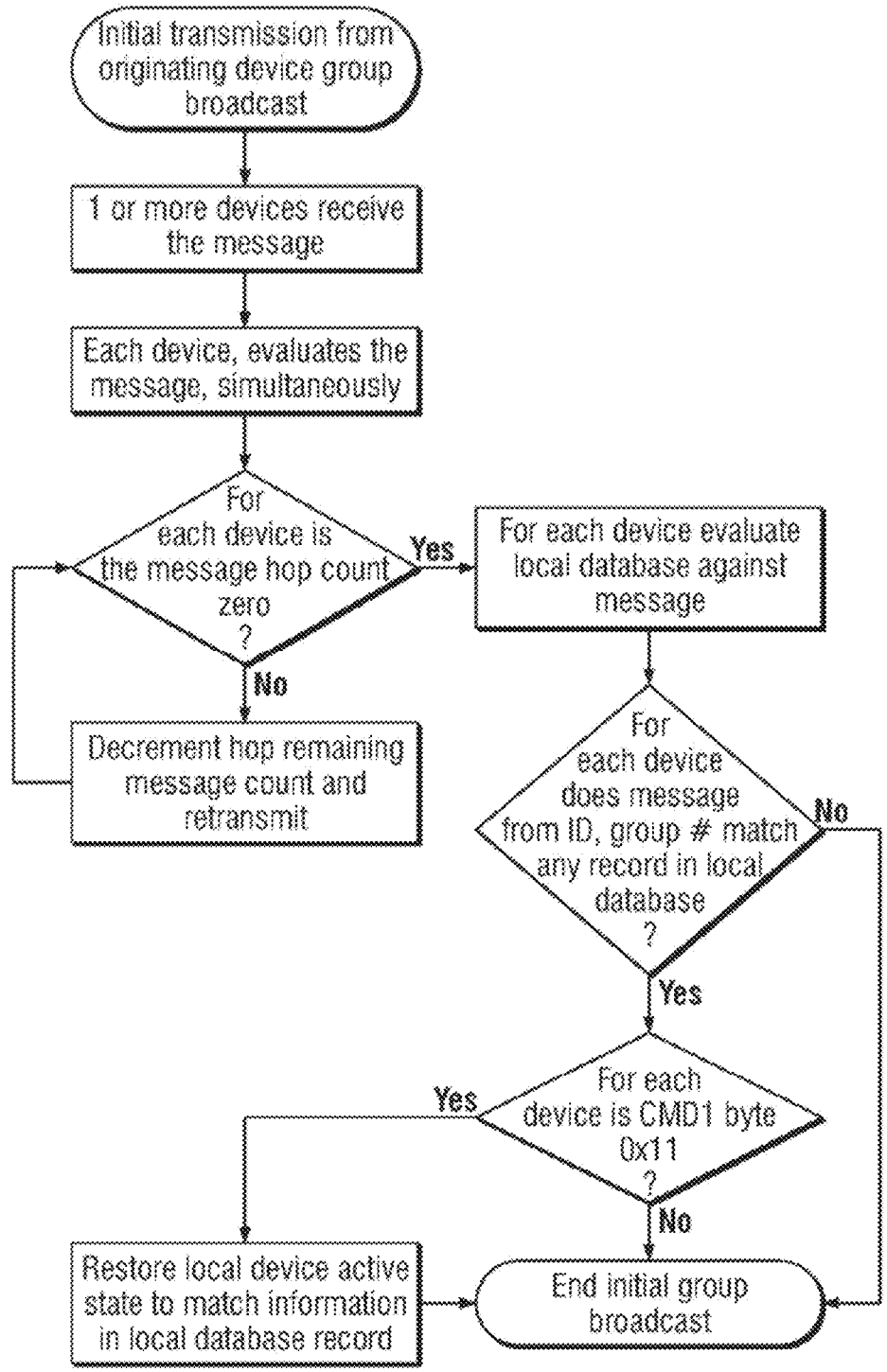
FIG. 6A is a logic flow diagram showing the process by which the method is conducted.
Figure 6B:
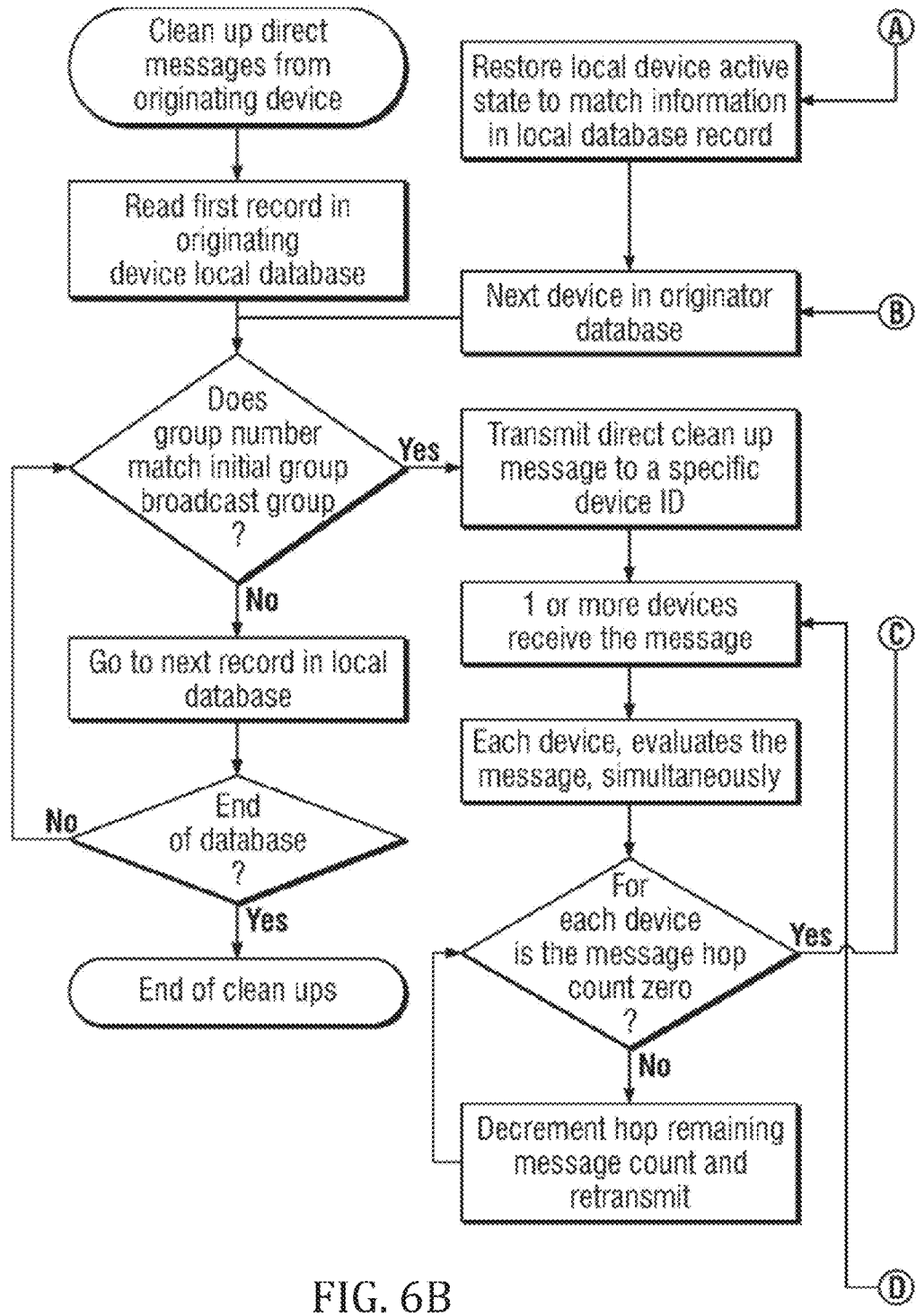
FIG. 6B is the first portion of a further logic flow diagram showing the process by which the method is conducted.
Figure 6C:
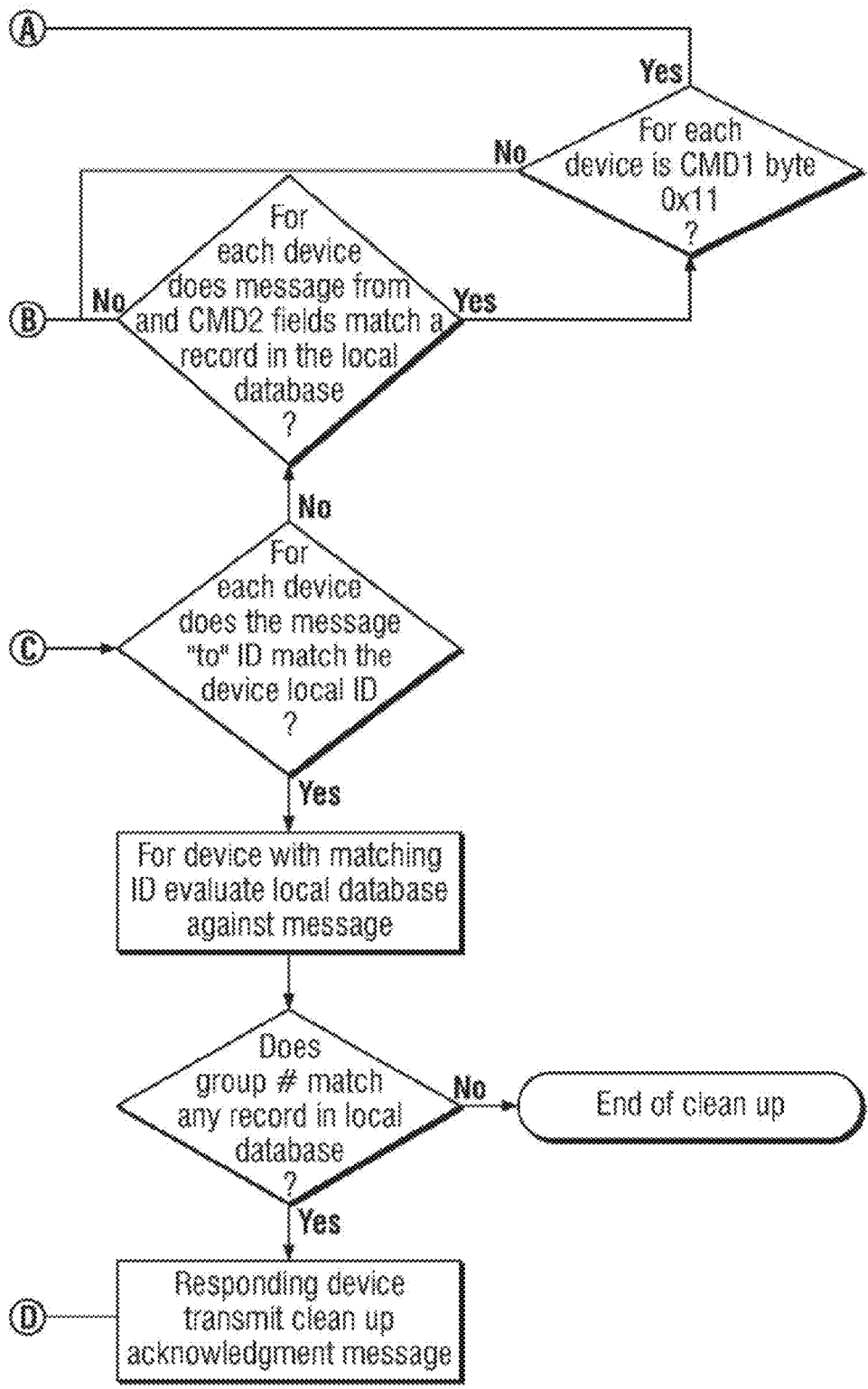
FIG. 6C is a second portion of the further logic flow diagram of FIG. 6B.

All devices repeating the Group Clean-up acknowledgement message transmitted by a group member have the additional opportunity to interrogate the message for relevance to information stored in memory. Since the message being repeated contains information including the address of the originator device, group number, and command; a comparison of this information with information stored in memory, can, based on an information match, cause the execution of a change in state to match values stored in memory. Since an acknowledgement message may originate from a different physical location than the precursor Group Clean-up Direct message, there is an opportunity for group members that do not receive the Group Clean-up Direct message to receive another group member's acknowledgement message. Also, since the occurrence in time is different between a Group Clean-up Direct message and an acknowledgement message, transient noise in the channel is typically not a hindrance to the reception of messages. The logical flow diagram of FIG. 6 defines an example of the processing of information in the channel by the originator device and the group devices in executing the present method. The usage of the term "command" that is delivered by a received message may take the meaning of; to execute a delivered instruction, or may alternately take the meaning of: to merely execute an instruction already in memory of the device receiving the message.

The present method of transmitting information between devices in a network of said devices operates through a communication channel which may use radio frequency transmissions, modulation on power lines and other means. The method includes transmitting a command message from an originator device to a first group of member devices of the network of devices where the member devices all have the same group number, see "Command 2" under "Data" in FIG. 3. Further, all of the member devices are programmed to resume a memory stored state when receiving a message with 0X11, see "Command 1," that is, a restore is executed. The number of devices in the first group may be any quantity including two or more. The originator device will have the same group number as all of the devices in the first group. Not all of the member devices of the first group may receive the command message so that those that do (the second group of devices), can be equal to or less than, in number, relative to the first group of devices. The devices of the second group will restore their status. As previously noted, a clean-up message is transmitted to each one of the devices in the first group, but since not all of these devices will receive the clean-up message, only those devices that do receive the clean-up message will respond with an acknowledgement message and this group of responders comprises a third group of devices that will respond by transmitting, each one in turn, an acknowledgement message to the originator device. The fourth group of devices is represented by those devices that are members of the group of devices that were sent clean-up messages, but did not receive either the original command broadcast or the clean-up messages or any repeated transmissions of these messages, but did receive an acknowledgement transmitted from any other member of the original group of member devices or hops therefrom. This added opportunity to receive a transmission carrying the group number and 0X11 Command 1 provides an important improvement in the Insteon protocol for improved message communication.

It should be clear that the second group and the third group may be equal in number or one may be larger than the other. From the foregoing we know that the groups may be represented as follows: GU, G1, G2, G3 and G4, where:

GU=the entire network of devices (universal group)
G1=all devices having the same group number and originator ID (G1<GU)
G2=all G1 devices receiving the command message (G2<G1)
G3=all G1 devices receiving the clean-up message (G3<G1) (G3<=>G2)
G4=non-members of G2 receiving G3 acknowledgements (G4<G3)

Embodiments of the subject apparatus and method have been described herein. Nevertheless, it will be understood that modifications may be made without departing from the spirit and understanding of this disclosure. Accordingly, other embodiments and approaches are within the scope of the following claims.

What is claimed is:

1. A method of transmitting information between devices in a network of said devices, the method comprising:
   transmitting a command message from an originator device of the network of devices to a first and a second group member devices of the network of devices;
   receiving the command message at only the first group member device but not the second group member device and thereby executing a restore of only the first group member device;
   transmitting a clean-up message from the originator device to the first group member device;
   receiving the clean-up message by the first group member device and transmitting an acknowledgement message from the first group member device to the originator device;
   transmitting a clean-up message from the originator device to the second group member device wherein the clean-up message is not received by the second group member device;
   receiving the acknowledgement message transmitted by the first group member device by the second group member device and executing a restore of the second group member device.

2. A method of transmitting information between devices in a network of said devices wherein the devices are able to exchange information through a communication channel, the method comprising:
   transmitting a command message from an originator device to a first group of member devices of the network of devices;
   receiving the command message by each one of a second group of the member devices, the second group of member devices thereby each executing a restore;
   transmitting, a clean-up message from the originator device to each one, in turn, of the first group of member devices;
   receiving the clean-up message by a third group of the member devices and in response transmitting by each one of the third group of member devices, in turn, an acknowledgement message to the originator device; and
   receiving an acknowledgement message from the third group of the member devices by a fourth group of the member devices thereby each executing a restore.

3. The method of claim 2 wherein transmissions, receptions, processing of the group command message, and forming of said acknowledgement messages is conducted according to a protocol wherein the protocol is in accordance with an Insteon® process.

4. The method of claim 2 wherein all acknowledgement message transmitted by devices of the third group of member devices includes a group number identification.

5. A method of operating a network of spatially separated electronic devices, the devices in mutual communication by at least one of wired and wireless means, and each of said devices having a data processor, a memory device, a transceiver, and a digital instruction set, the instruction set stored within the memory device, each said one of the devices, enabled according to a protocol established by the instruction set, for processing messages carried by received transmissions, and for transmitting messages, the method comprising:
   transmitting a group command message from a first one of the devices to a selected group of the devices;
   receiving the group command message by a second one of the devices of said group of the devices, the second one of the devices executing a restore;
   transmitting a first acknowledgement message to the first one of the devices by the second one of the devices;
   receiving the acknowledgement message by a third one of the devices of the group of devices and executing a restore.

* * * * *